US012800020B2

(12) United States Patent
Denefleh et al.

(10) Patent No.: US 12,800,020 B2
(45) Date of Patent: Nov. 17, 2026

(54) DRIVE HAVING A HOUSING, ADAPTER PLATE, AND COVER HOOD

(71) Applicant: SEW-EURODRIVE GMBH & CO. KG, Bruchsal (DE)

(72) Inventors: Roland Denefleh, Einhausen (DE); Stefan Kutsch, Tiefenbach (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 9 days.

(21) Appl. No.: 17/928,715

(22) PCT Filed: May 18, 2021

(86) PCT No.: PCT/EP2021/063163
§ 371 (c)(1),
(2) Date: Nov. 30, 2022

(87) PCT Pub. No.: WO2021/244848
PCT Pub. Date: Dec. 9, 2021

(65) Prior Publication Data
US 2023/0235816 A1 Jul. 27, 2023

(30) Foreign Application Priority Data
Jun. 2, 2020 (DE) ......................... 102020003303.2

(51) Int. Cl.
*F16H 57/02* (2012.01)
*F16H 57/029* (2012.01)
(Continued)

(52) U.S. Cl.
CPC ......... *F16H 57/031* (2013.01); *F16H 57/029* (2013.01); *H02K 5/10* (2013.01); *H02K 7/116* (2013.01); *F16H 2057/02034* (2013.01)

(58) Field of Classification Search
CPC ................. F16H 57/029; F16H 57/031; F16H 2057/02034; F16H 2057/02069; H02K 5/10; H02K 7/116; F16D 1/04
See application file for complete search history.

(56) References Cited

U.S. PATENT DOCUMENTS 2,695,726 A * 11/1954 Chatfield ............. F16H 57/031
220/327
9,157,508 B2 * 10/2015 Allgaier ................. F16C 25/06
(Continued)

FOREIGN PATENT DOCUMENTS

CN 105471188 A * 4/2016 ............. B62D 5/046
CN 112467918 A * 3/2021 ............. F16H 57/02
(Continued)

OTHER PUBLICATIONS

Machine translation of EP 1911995 A2 obtained on Jan. 30, 2024.*
(Continued)

*Primary Examiner* — Adam D Rogers
(74) *Attorney, Agent, or Firm* — Carter, DeLuca & Farrell LLP

(57) ABSTRACT

A drive includes a housing, an adapter plate, and a cover hood. A flat support surface is provided on the housing, e.g., for placement of the cover hood, and the adapter plate is attached to the housing. A first sealing ring, e.g., an O-ring, is received on the outer circumference of the adapter plate and is arranged between the cover hood and the cover plate, e.g., for sealing. A second sealing ring, e.g., an O-ring or a flat sealing ring, is received and/or attached to the side of the adapter plate facing the support surface, and the second sealing ring is arranged between the adapter plate and the support surface, e.g., for sealing.

27 Claims, 3 Drawing Sheets

(51) Int. Cl.

| | |
|---|---|
| ***F16H 57/031*** | (2012.01) |
| ***H02K 5/10*** | (2006.01) |
| ***H02K 7/116*** | (2006.01) |

(56) References Cited

U.S. PATENT DOCUMENTS

| | | | | |
|---|---|---|---|---|
| 10,591,079 | B2 * | 3/2020 | Yamanaka | H02K 5/225 |
| 10,760,669 | B2 * | 9/2020 | Herzel | F16H 57/02 |
| 11,739,824 | B1 * | 8/2023 | Mikurino | F16H 9/14<br>474/8 |
| 2023/0366465 | A1 * | 11/2023 | Nakai | F16J 15/164 |
| 2023/0400089 | A1 * | 12/2023 | Bühn | F16H 57/021 |

FOREIGN PATENT DOCUMENTS

| | | | | | |
|---|---|---|---|---|---|
| CN | 114934996 | A | * | 8/2022 | |
| DE | 102007002527 | A1 | | 7/2008 | |
| DE | 102010050756 | A1 | | 5/2012 | |
| DE | 102013003165 | A1 | * | 9/2013 | F16H 57/025 |
| EP | 1911995 | A2 | * | 4/2008 | F16H 57/029 |
| EP | 3534508 | A1 | | 9/2019 | |
| WO | 2010012347 | A1 | | 2/2010 | |
| WO | WO-2013156111 | A1 | * | 10/2013 | F16H 57/029 |

OTHER PUBLICATIONS

Machine translation of WO 2013/156111 A1 obtained on Jan. 30, 2024.*

Machine translation of CN 105471188 A obtained on Jun. 11, 2024.*

International Search Report issued in corresponding International Application No. PCT/EP2021/063163 dated Aug. 6, 2021, pp. 1-2, English Translation.

International Report on Patentability issued in corresponding International Application No. PCT/EP2021/063163 dated Dec. 6, 2022, pp. 1-8, English Translation.

* cited by examiner

A

DRIVE HAVING A HOUSING, ADAPTER PLATE, AND COVER HOOD

FIELD OF THE INVENTION

The present invention relates to a drive having a housing, an adapter plate, and a cover hood.

BACKGROUND INFORMATION

In certain conventional systems, a gearbox driven by an electric motor is arranged as a drive.

A sealing element is described in German Patent Document No. 10 2007 002 527.

SUMMARY

Example embodiments of the present invention provide a drive, in which reliable operation is able to be achieved in a simple and cost effective manner.

According to an example embodiment of the present invention, a drive includes a housing, an adapter plate, and a cover hood. A flat support surfaces is arranged on the housing, e.g., for placement of the cover hood, and the adapter plate is attached to the housing. A first seal, e.g., an O-ring, is received on the outer circumference of the adapter plate and is arranged between the cover hood and cover plate, e.g., for sealing. A second sealing ring, e.g., an O-ring or flat sealing ring, is received and/or attached to the side of the adapter plate facing the support surface, and the second sealing ring is arranged between the adapter plate and the support surface, e.g., for sealing.

Thus, reliable operation is provided in that a rotating part is covered by the cover hood and thus there is protection from contact with the rotating part. The cover hood can be attached to a flat surface of the housing, creating a seal. This is reliably and readily achieved during production in that threaded holes are added to the flat surface, e.g., the support surface, and screws guided through an adapter plate are screwed into the threaded holes, pressing the adapter plate towards the flat surface. Thus, the adapter hood can be placed over the adapter plate and can be connected to the adapter plate in a sealing manner by a first seal, on the one hand, and also in a non-positive fit, on the other hand. For further securing, a tab region of the cover hood can also be attached by an additional screw that is screwed into an additional threaded hole added to the support surface. In this manner, it is possible to effect positive-fit securing of the cover hood, as well. For example, the cover hood can be pressed against the support surface by elastic deformation of the tab region caused when the additional screw is tightened. To this end an incline can be provided and used on the tab region.

According to example embodiments, a second sealing ring, with which the adapter plate can be sealingly connected to the support surface, can be attached to the adapter plate. In this manner, the space enclosed by the cover hood is sealed against the surroundings.

Since the adapter plate can be produced as a plastic injection molded part, the first and/or the second sealing ring can also be produced integrally and/or in one piece together with the adapter plate.

According to example embodiments, the drive includes a gearbox driven by an electric motor, and the housing forms the housing for the electric motor and the gearbox.

Thus, the drive can be arranged as a compact drive, in which the housing has a central housing part which receives not just a bearing of the rotor shaft of the electric motor, but also at least one bearing or both bearings for the output shaft of the gearbox. Thus, the motor can be centered with respect to the gearbox by the central housing part. For example, the rotor shaft can be arranged parallel to the shaft of the gearbox arranged as a hollow output shaft and the axial region covered by the rotor can be arranged overlapping with the axial region covered by the output shaft.

According to example embodiments, a shaft of the drive projects into a space surrounded by the cover hood, and the shaft, for example, is the output shaft of the gearbox. Thus, protection against contact can be achieved. For example, the solid shaft of a machine to be driven by the drive, which is inserted into the output shaft of the drive, i.e., the gearbox, can be connected by a shrink disc arranged within the space surrounded by the cover hood.

According to example embodiments, the shaft projects through a recess of the housing and/or through a recess of the adapter plate. Thus, the shaft can project out and the non-positive fit connection can be achieved by the shrink disc outside of the housing.

According to example embodiments, a shrink disc placed over the shaft connects the shaft in a non-positive fit to a further shaft inserted into the shaft, and, for example, the shrink disk is arranged in the space surrounded by the cover hood. Thus, protection from contact can be achieved readily and reliably.

According to example embodiments, the adapter plate is produced as a plastic injection molded part. Thus, production is straight-forward and cost-effective.

According to example embodiments, the cover hood is produced as a plastic injection molded part. Thus, production is straight-forward and cost-effective.

According to example embodiments, the adapter plate is pressed towards the support surface by screw heads of screws passing through the adapter plate and screwed into threaded holes in the support surface. For example, the drill pattern formed by the threaded holes has a discrete rotational symmetry, e.g., that the adapter plate does not have, and, for example, the adapter plate has a preferred direction along which the adapter plate has its greatest extension. For example, the preferred direction is oriented parallel to the plane containing the contact surface provided, e.g., effected, on the cover hood. Thus, secure attachment of the adapter plate can be achieved, which allows the cover hood to be placed on a flat contact surface and seals the connection between the contact surface and the cover hood. In addition, the asymmetrical outer circumference of the adapter plate is adapted to the similar inner circumference of the adapter hood, so that twisting is prevented.

According to example embodiments, the adapter plate includes continuous recesses spaced apart from one another and passing through the adapter plate, e.g., normal to the plane containing the contact surface provided, e.g., effected, on the cover hood. For example, the screws pressing the adapter plate towards the support surface are arranged in the circumferential direction between the recesses. Thus, increased elasticity of the adapter plate and an improved seal can be achieved.

According to example embodiments, the first sealing ring is received in a first groove arranged on the outer circumference of the adapter plate, e.g., a first groove extending continuously in the circumferential direction. For example, the first groove is open radially outward and/or the first sealing ring projects radially outward out of the first groove. Thus, the first groove follows the outer circumference having only a single mirror symmetry and not having rotational symmetry. The groove is open radially outward, so that the first sealing ring, e.g., an O-ring, can be inserted from radially outward into the first groove, so that this first sealing ring projects only in part out of the groove. In this manner, the first sealing ring is securely attached and produces the sealing tightness to the cover hood.

According to example embodiments, the second sealing ring is received in a second groove that is arranged on the side of the adapter plate facing the support surface and that extends continuously in the circumferential direction. The second groove is open towards the support surface and/or the second sealing ring projects out of the second groove towards the support surface. Thus, the second groove is provided in a lateral surface of the adapter plate that is otherwise arranged flat and is open towards the support surface. Thus, an O-ring that projects towards the support surface and creates a seal can also be inserted into this second groove.

According to example embodiments, a radially projecting tab region is formed on the cover hood, through which tab region a screw projects, the threaded region of which is screwed into a threaded hole of the support surface, and the screw head of which presses the tab region towards the support surface. Thus, the cover hood can be secured to the support surface in a positive fit.

According to example embodiments, the wall thickness of the tab region increases as the radial distance to the rotational axis of the shaft increases. For example, when the cover hood is in a loose state, e.g., before placement onto and connection to the adapter plate, a surface region of the tab region facing away from the support surface is formed as a flat surface that is parallel to the contact surface provided on the cover hood for contacting the support surface. For example, when the cover hood is positioned onto the support surface and the screw is tightened, the tab region is pressed and elastically deformed such that the entire contact surface of the cover hood is positioned against the support surface. Thus, by the course of the wall thickness of the tab region, a free space between the tab region and the support surface is available that grows increasingly thick towards the rotational axis and that presses the tab region towards the support surface when the screw is tightened and thus reduces and/or eliminates the space, so that the tab region is elastically deformed and because of this the cover hood is pressed against the support surface, e.g., completely and/or continuously in the circumferential direction. This is because the free space is bridged by a part of the tab region and the screw presses the bridge region of the tab region formed in this manner against the support surface, in which the tab region is elastically deformed and therefore presses the rest of the cover hood against the support surface by the bridge region.

According to example embodiments, the adapter plate has a radially projecting projection, and an edge region of the cover hood is inserted and received between the projection and a dome-like elevation of the housing part delimiting the support surface. Thus, the adapter plate has a preferred direction, so that the desired orientation is readily discernable during assembly. In addition, the projection can be oriented relative to a dome-like region of the housing and the edge of the cover hood can be inserted or even clamped between the projection and the dome-like region. The cover hood is thereby attached even more tightly and securely to the housing.

According to example embodiments, the adapter plate has the largest diameter in the circumferential angular region covered by the projection, e.g., in relation to the rotational axis of the shaft, e.g., within a plane whose normal is oriented parallel to the rotational axis of the shaft. Thus, a preferred direction is formed and the desired orientation can be readily discerned during assembly. In addition, the projection can be oriented relative to a dome-shaped region of the housing and the edge of the cover hood can be inserted or even clamped between the projection and the dome-shaped region. Because of this, the cover hood is attached even more tightly and securely to the housing.

According to example embodiments, the maximum radial distance, e.g., to the rotational axis of the shaft, is as a function of the circumferential angle, e.g., within a or the plane, the normal of which is oriented parallel to the rotational axis of the shaft, has an absolute and plurality of local maximums, e.g., in the range between 0° and 360°. Two maximums adjacent to one another in the circumferential direction each have an angular distance of 45° to one another. For example, one absolute and seven local maximums are provided, in which two maximums adjacent to one another in the circumferential direction each have an angular distance of 45° to one another. Thus, the cover hood can only be positioned in a single orientation relative to the adapter plate and reliable sealing can be provided by the first sealing ring, which is positioned extending completely, e.g., continuously, in the circumferential direction against the cover hood.

According to example embodiments, the first sealing ring is positioned extending completely and/or continuously in the circumferential direction against the cover hood. Thus, a high degree of protection can be achieved. In addition, oil that in a possible leak of a shaft sealing ring arranged relative to the cover hood on the output shaft of the gearbox penetrates into the space surrounding the cover hood is reliably separated from the surroundings by the first and second sealing rings.

Further features and aspects of example embodiments of the present invention are explained in greater detail below with reference to the appended schematic Figures.

DETAILED DESCRIPTION

Figure 1:
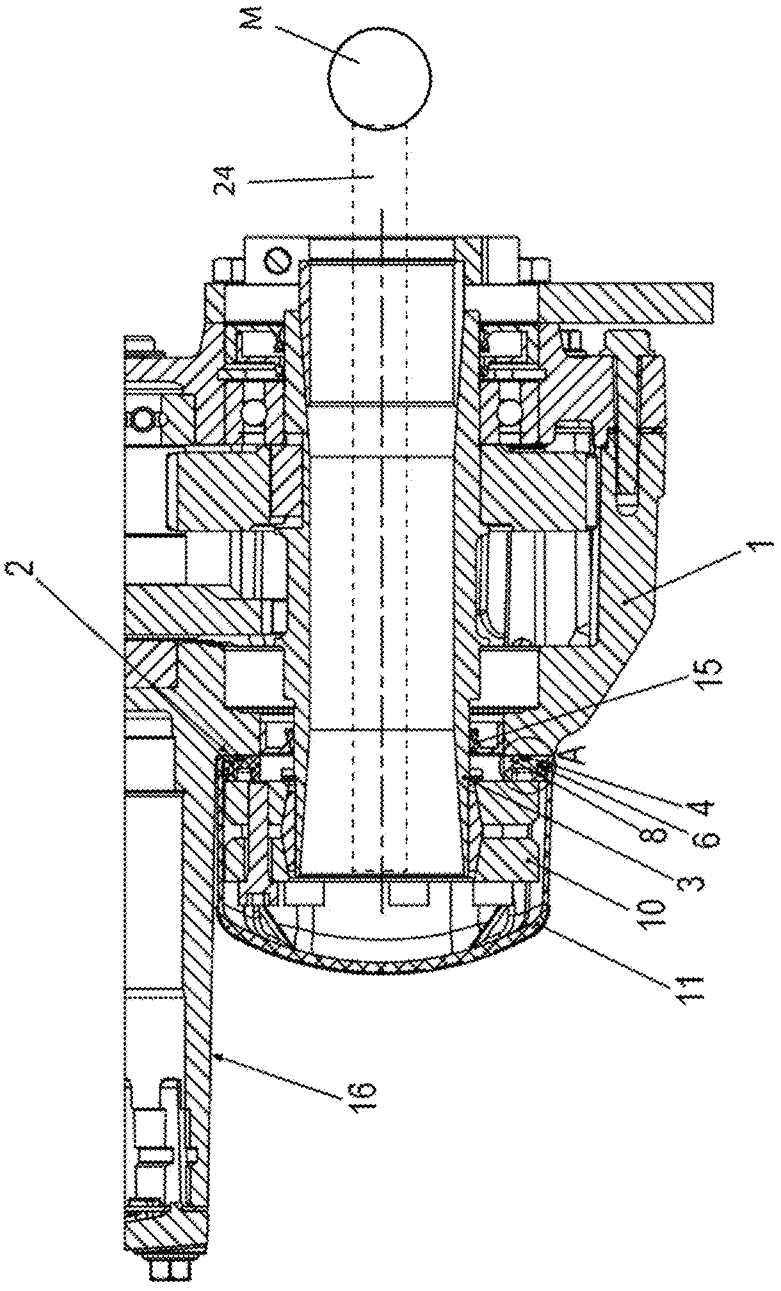
FIG. 1 is a cross-sectional view through a subregion of a drive.
Figure 2:
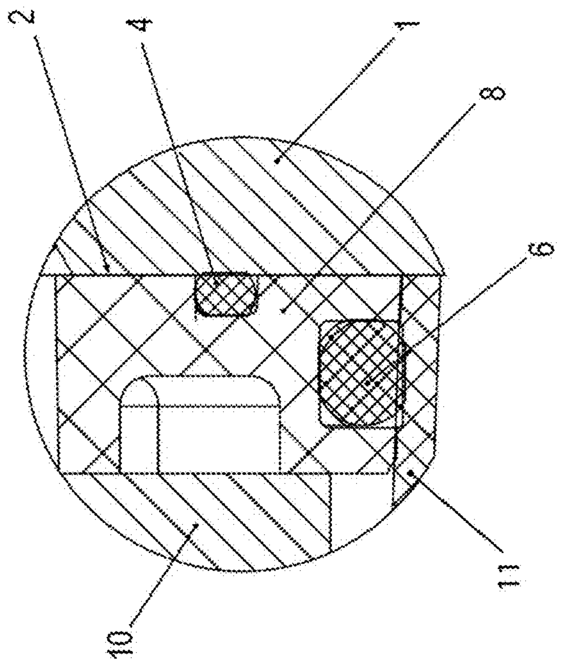
FIG. 2 is an enlarged portion of FIG. 1.
Figure 3:
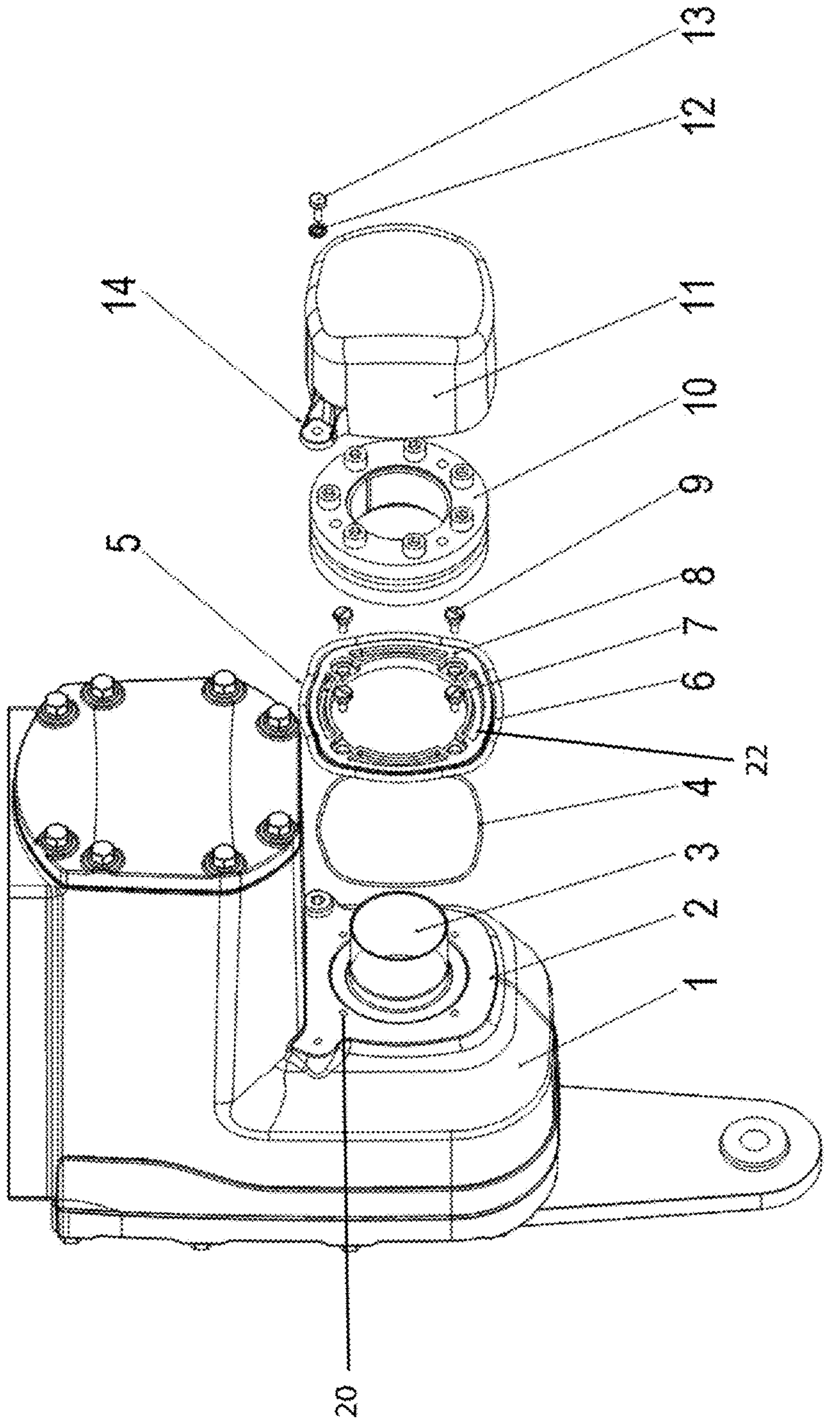
FIG. 3 is a perspective view of the drive, including an exploded view of parts of the subregion.

As illustrated depicted in the Figures, the drive has an output shaft 3 of a gearbox driven by an electric motor. The electric motor M having the gearbox is arranged integrated in a common housing 1.

The shaft 3 is arranged, for example, as a hollow shaft, so that the solid shaft or hollow shaft 24 of a device to be driven can be inserted into the hollow shaft and is connectable in a non-positive fit by a shrink disc 10 placed over the shaft 3.

The shaft of the device is inserted from a first end region of the shaft 3 into the shaft 3 and clamped in a non-positive fit by shrinking the shrink disc 10.

In doing so, the axial region covered by the shaft of the device overlaps or entirely contains the region covered in the axial direction by the shrink disk 10.

The shrinking is effected by tightening the axially oriented screws of the shrink disc in that the two discs are moved towards one another during the tightening and thereby press together the clamping ring of the shrink disc 10 positioned on the shaft 3 via the tapered pressing surfaces.

A cover hood 11 is provided on the drive to prevent contact with rotating parts.

This cover hood surrounds the shrink disc 10 and is positioned against a support surface 2 of the housing 1, in which an extremely narrow gap can occur between the support surface 2 and the cover hood 11, that is, there does not necessarily have to be contact.

The support surface 2 is, for example, flat.

Arranged on the cover hood is a tab region 14 projecting radially with respect to the rotational axis of the shaft 3 and through which a screw 13 projects, the threaded region of which is screwed into a threaded hole 20 of the support surface 2 and the screw head of which presses the tab region 14 towards the support surface 2; however, this pressing of the cover hood 11 cannot be implemented with great reliability.

To achieve a reliable seal, an adapter plate 8 is pressed against the housing 1 by screws 7, 9 passing through the adapter plate 8. In doing so, the screw heads of the screws 7, 9 press the adapter plate 8 towards the support surface 2, and a second sealing ring 4, e.g., a flat sealing ringing ring or O-ring, is received on the adapter plate 8 and presses against the support surface 2. The second sealing ring 4 is arranged circumferentially, e.g., continuously circumferentially, in the circumferential direction with respect to the rotational axis of the shaft 3.

The second sealing ring 4 is thus arranged between the adapter plate 8 and the support surface 2 and is elastically deformed, so that the region arranged radially inside the second sealing ring 4 between the adapter plate 8 and the support surface 2 is sealed against the surroundings.

A groove extending circumferentially into which an O-ring is, at least in part, pressed and/or inserted as a second sealing ring is provided on the side of the adapter plate 8 facing the support surface 2.

The screws 7, 9 are screwed into threaded holes of the support surface 2. These threaded holes form a drill pattern having a discrete 90° rotational symmetry relative to the rotational axis of the shaft 3. That is, the adapter plate 8 is connectable to the housing 1 in four orientations.

The outer circumference of the adapter plate does not have any discrete rotational symmetry, however. Thus, a preferred direction can be seen with the naked eye.

A groove is provided on the outer circumference and is open in the radial direction, that is, to the back. This groove is arranged circumferentially, e.g., continuous circumferentially, in the circumferential direction.

A first sealing ring, e.g., an O-ring, is received in this groove. That projects on the outer circumference. When the cover hood 11 is positioned, this first sealing ring 6 is elastically deformed and thus effects a tight connection between the adapter plate 8 and the cover hood 11.

The support surface 2 is arranged flat, in which the associated normal direction, e.g., the direction normal to the plane containing the support surface 2, is oriented parallel to direction of the rotational axis of the shaft 3.

The shaft 3 is rotatably supported by at least one bearing received in the housing 1. Also received in the housing 1 is a shaft sealing ring 15 that seals an oil-filled inner space of the gearbox of the drive against the shaft 3. seals the housing. However, even if this shaft sealing ring 15 is not tight, leaked oil would only penetrate into the region surrounding the cover hood 11. This is because this region is sealed against the surroundings by the first and second sealing rings 4, 6. This would even apply if there was a gap between adapter plate 8 and the support surface 2 and/or if there was a gap between cover hood 11 and the support surface 2.

The adapter plate 8 is, for example, arranged as a plastic injection molded part. The cover hood 11 is, for example, arranged as a plastic injection molded part.

The outer circumference of the adapter plate 8 is a rounded square having a projection 5 on a first side, e.g., projecting radially. The outer circumference does not project as far radially on the opposing side as on the first side.

Likewise, the outer circumference does not project as far radially on the two other sides as on first side.

The support surface 2 is delimited on one side by a sub-region of the housing 1 that arches in a dome-like manner in the direction normal to the support surface 2. Thus, the cover hood 11 when positioned is inserted between the sub-region 16 arching in a dome-like manner and the first sealing ring in the region of the projection 5. This positioning can thus be accomplished, e.g., rapidly and readily.

The adapter plate 8 has continuous, e.g., axially continuous, recesses 22. These recesses are disposed radially inside the first and second sealing rings 4, 6, however. Thus, the adapter plate 8 is arranged elastic and in a material-saving manner, yet sealing tightness is assured.

According to exemplary embodiments, a wall thickness that increases as the radial distance to the rotational axis of the shaft 3 increases is arranged on the tab region 14, e.g., in which, when the cover hood 11 is in a loose state, e.g., before placement onto and connection to the adapter plate 11, a surface region of the tab region 14 facing away from the support surface 2 is formed as a flat surface that is parallel to the contact surface provided on the cover hood 11 for contacting the support surface 2. Thus, when the cover hood 11 is placed onto the support surface 2 and the screws 13 are tightened, the tab region is pressed and elastically deformed such that the entire contact surface of the cover hood is positioned against the support surface 2 in a gap-free manner.

LIST OF REFERENCE NUMERALS

1 Housing
2 Support surface, e.g., a flat surface
3 Shaft, e.g., a hollow shaft
4 Second sealing ring
5 Projection
6 First sealing ring
7 Screw
8 Adapter plate
9 Screw
10 Shrink disc
11 Cover hood
12 Toothed disk
13 Screw
14 Tab region, projecting on the cover hood

The invention claimed is:

1. A drive, comprising:

a housing including a flat support surface;

an adapter plate attached to the housing;

a cover hood;

a first sealing ring arranged on an outer circumference of the adapter plate and arranged between the cover hood and the adapter plate; and a second sealing ring arranged on and/or attached to a side of the adapter plate facing the support surface and arranged between the adapter plate and the support surface;

wherein the drive includes a gearbox adapted to be driven by an electric motor; and wherein the housing houses the electric motor and the gearbox.

2. The drive according to claim 1, wherein the adapter plate includes a first groove located on the outer circumference of the adapter plate and extending continuously in a circumferential direction and a second groove located on a side of the adapter plate facing the support surface and extending continuously in the circumferential direction, the first sealing ring is arranged in the first groove and forms a seal between the cover hood and the adapter plate, and the second sealing ring is arranged in the second groove and forms a seal between the adapter plate and the support surface.

3. The drive according to claim 1, wherein the cover hood is adapted to be placed on the support surface.

4. The drive according to claim 1, wherein the first sealing ring is arranged as an O-ring, and the second sealing ring is arranged as an O-ring or a flat sealing ring.

5. The drive according to claim 1, wherein a shaft of the drive projects into a space surrounded by the cover hood.

6. The drive according to claim 5, wherein the shaft projects through a recess of the housing and/or through a recess of the adapter plate.

7. The drive according to claim 1, wherein the adapter plate and/or the cover hood is arranged as an injection molded part.

8. The drive according to claim 1, wherein screw heads of screws, passing through the adapter plate and screwed into threaded holes in the support surface, press the adapted plate toward the support surface.

9. The drive according to claim 8, wherein a drill pattern of the threaded holes has a discrete rotational symmetry, that the adapter plate does not have.

10. The drive according to claim 9, wherein the adapter plate has a preferred direction along which the adapter plate has a greatest extension.

11. The drive according to claim 10, wherein the preferred direction is oriented parallel to a plane that includes a contact surface of the cover hood.

12. The drive according to claim 1, wherein the first sealing ring is arranged in a first groove located on the outer circumference of the adapter plate.

13. The drive according to claim 12, wherein the first groove extends continuously in a circumferential direction and/or is open radially outward and/or the first sealing ring projects radially outward out of the first groove.

14. The drive according to claim 1, wherein the second sealing ring is arranged in a groove that is located on a side of the adapter plate facing the support surface and that extends continuously in a circumferential direction, the second groove being open toward the support surface and/or the second sealing ring projecting out of the second groove toward the support surface.

15. The drive according to claim 1, wherein the cover hood includes a radially projecting tab region through which a screw projects, a threaded region of the screw being screwed into a threaded hole of the support surface, a screw head of the screw pressing the tab region toward the support surface.

16. The drive according to claim 15, wherein the tab region is elastically deformable.

17. The drive according to claim 16, wherein, before the cover hood is placed onto and connected to the adapter plate, a surface region of the tab region facing away from the support surface is arranged as a flat surface that is parallel to a contact surface provided on the cover hood for contacting the support surface, and, when the cover hood is positioned onto the support surface and the screw is then tightened, the tab region is pressed and elastically deformed such that the entire contact surface of the cover hood is positioned against the support surface.

18. The drive according to claim 1, wherein the adapter plate includes a radially projecting projection, and an edge region of the cover hood is arranged between the projection and an elevation of the housing delimiting the support surface.

19. The drive according to claim 1, the first sealing ring extends completely and/or continuously in a circumferential direction against the cover hood.

20. A drive, comprising:

a housing including a flat support surface;

an adapter plate attached to the housing;

a cover hood;

a first sealing ring arranged on an outer circumference of the adapter plate and arranged between the cover hood and the adapter plate; and a second sealing ring arranged on and/or attached to a side of the adapter plate facing the support surface and arranged between the adapter plate and the support surface;

wherein a shaft of the drive projects into a space surrounded by the cover hood; and wherein the shaft is arranged as an output shaft of a gearbox of the drive.

21. The drive according to claim 20, wherein the drive includes a gearbox adapted to be driven by an electric motor.

22. A drive, comprising:

a housing including a flat support surface;

an adapter plate attached to the housing;

a cover hood;

a first sealing ring arranged on an outer circumference of the adapter plate and arranged between the cover hood and the adapter plate; and a second sealing ring arranged on and/or attached to a side of the adapter plate facing the support surface and arranged between the adapter plate and the support surface;

wherein a shaft of the drive projects into a space surrounded by the cover hood; and wherein a shrink disk arranged over the shaft connects the shaft in a non-positive fit to a further shaft inserted into the shaft.

23. The drive according to claim 22, wherein the shrink disk is arranged in the space surrounded by the cover hood.

24. A drive, comprising:

a housing including a flat support surface;

an adapter plate attached to the housing;

a cover hood;

a first sealing ring arranged on an outer circumference of the adapter plate and arranged between the cover hood and the adapter plate; and a second sealing ring arranged on and/or attached to a side of the adapter plate facing the support surface and arranged between the adapter plate and the support surface;

wherein the adapter plate includes continuous recesses spaced apart from one another and passing through the adapter plate.

25. The drive according to claim 24, wherein the recesses extend in a direction normal to a plane that includes a contact surface of the cover hood.

26. A drive, comprising:

a housing including a flat support surface;

an adapter plate attached to the housing;

a cover hood;

a first sealing ring arranged on an outer circumference of the adapter plate and arranged between the cover hood and the adapter plate; and a second sealing ring arranged on and/or attached to a side of the adapter plate facing the support surface and arranged between the adapter plate and the support surface;

wherein screw heads of screws, passing through the adapter plate and screwed into threaded holes in the support surface, press the adapted plate toward the support surface; and wherein the adapter plate includes continuous recesses spaced apart from one another and passing through the adapter plate, the recesses extend in a direction normal to a plane that includes a contact surface of the cover hood, and the screws are arranged in a circumferential direction between the recesses.

27. A drive, comprising:

a housing including a flat support surface;

an adapter plate attached to the housing;

a cover hood;

a first sealing ring arranged on an outer circumference of the adapter plate and arranged between the cover hood and the adapter plate; and a second sealing ring arranged on and/or attached to a side of the adapter plate facing the support surface and arranged between the adapter plate and the support surface;

wherein the adapter plate includes a radially projecting projection, and an edge region of the cover hood is arranged between the projection and an elevation of the housing delimiting the support surface; and wherein a diameter of the projection corresponds to a largest diameter of the adapter plate.

* * * * *